(12) United States Patent
Li et al.

(10) Patent No.: US 11,005,981 B2
(45) Date of Patent: May 11, 2021

(54) CAMERA MODULE AND ELECTRONIC DEVICE INCLUDING THE SAME

(71) Applicant: TRIPLE WIN TECHNOLOGY(SHENZHEN) CO. LTD., Shenzhen (CN)

(72) Inventors: Jing-Wei Li, Guangdong (CN);
Shin-Wen Chen, New Taipei (TW);
Sheng-Jie Ding, Guangdong (CN);
Jian-Chao Song, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/583,569

(22) Filed: Sep. 26, 2019

(65) Prior Publication Data

US 2021/0058499 A1  Feb. 25, 2021

(30) Foreign Application Priority Data

Aug. 20, 2019  (CN) .......................... 201921356873.0

(51) Int. Cl.
*H04M 1/02* (2006.01)

(52) U.S. Cl.
CPC ...... *H04M 1/0264* (2013.01); *H04M 2250/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,023,040 B2* | 9/2011 | Zhou | ..................... | H04N 5/2252 348/376 |
| 8,054,379 B2* | 11/2011 | Yuan | ................... | H04M 1/0264 348/376 |
| 9,288,471 B1* | 3/2016 | Yang | ........................ | G06F 3/017 |
| 10,887,436 B2* | 1/2021 | Zeng | ................... | H04M 1/0237 |
| 2007/0213103 A1* | 9/2007 | Zaitsu | ................. | H04M 1/0216 455/575.3 |
| 2015/0381781 A1* | 12/2015 | Feng | ................... | H04M 1/0208 455/566 |
| 2016/0088130 A1* | 3/2016 | Jung | ........................ | H01Q 1/52 455/575.1 |
| 2020/0081227 A1* | 3/2020 | Huang | ................. | H04N 5/2258 |
| 2020/0084307 A1* | 3/2020 | Gong | .................. | H04M 1/0208 |
| 2020/0322515 A1* | 10/2020 | Jia | ...................... | H04N 5/23299 |
| 2020/0374433 A1* | 11/2020 | Zhang | .................... | H04N 5/225 |

* cited by examiner

*Primary Examiner* — Steven S Kelley
(74) *Attorney, Agent, or Firm* — ScienBiziP, P.C.

(57) ABSTRACT

A single camera module able to swivel to capture images in front of and behind an electronic device includes a housing, a camera module, and a turnover element. The turnover element includes a support plate and a connecting portion. The housing is arranged on the support plate, thus forming a receiving space together with the support plate. The camera assembly is received in the receiving space. The connecting portion is arranged on the support plate and located on an outside of the housing. The disclosure further provides an electronic device including the camera module.

6 Claims, 11 Drawing Sheets

CAMERA MODULE AND ELECTRONIC DEVICE INCLUDING THE SAME

FIELD

The subject matter herein generally relates to optical devices, and more particularly to a camera module and an electronic device including the same.

BACKGROUND

A front-facing camera is generally configured into a hole defined on a display screen of an electronic device for self-photography, and a rear-facing camera is generally configured into a hole defined on a rear panel of the electronic device for photographing other people. However, the front-facing camera takes up space on the front side of the electronic device, a screen ratio of the electronic device must be lower due to the space taken up by the hole defined on the display screen.

BRIEF DESCRIPTION OF THE DRAWINGS

Implementations of the present technology will now be described, by way of embodiment, with reference to the attached figures.

DETAILED DESCRIPTION

Figure 1:
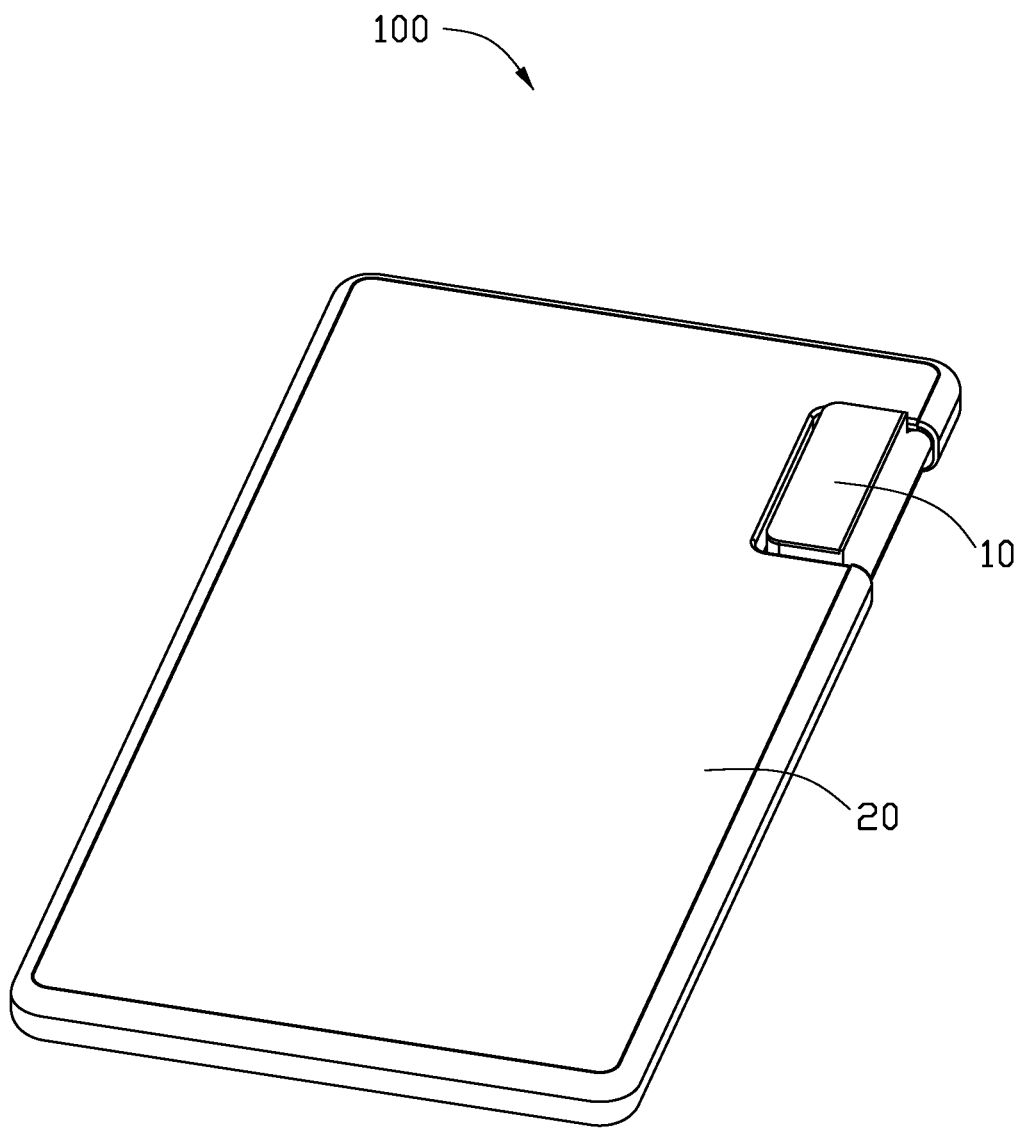
FIG. 1 is an isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
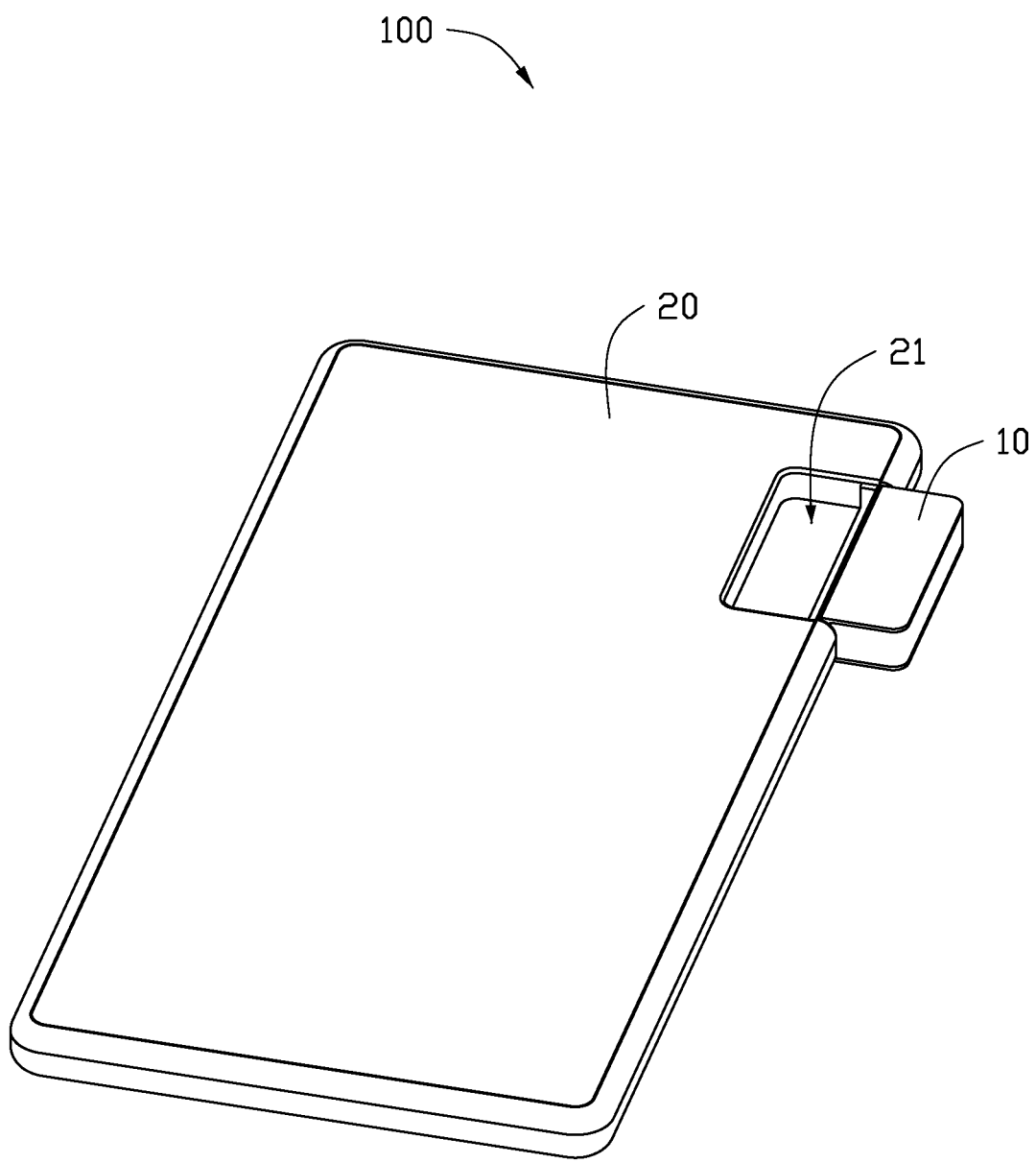
FIG. 2 is an isometric view of the electronic device of FIG. 1 with camera pointing towards the front.

FIGS. 1-2 illustrate an electronic device in one embodiment (electronic device 100). The electronic device 100 can be any device having image capturing functions, such as a tablet personal computer, or a mobile phone, etc. In one embodiment, the electronic device 100 is a mobile phone.

The electronic device 100 includes a camera module 10 and a base body 20. The base body 20 defines a receiving groove 21 on an edge thereof. The camera module 10 is rotatably coupled to the base body 20 and can be received in the receiving groove 21.

Figure 3:
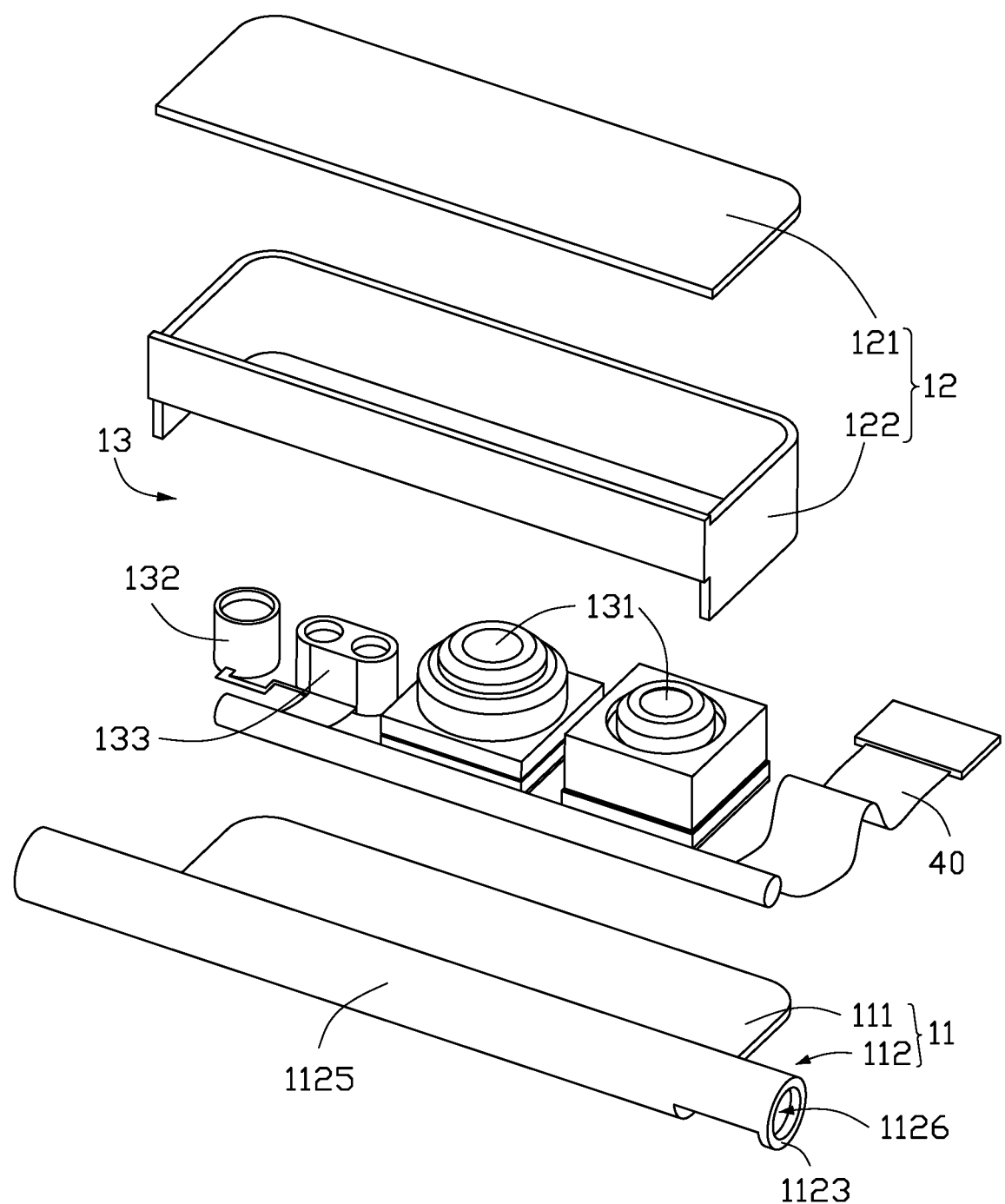
FIG. 3 is an exploded, isometric view of a camera module of the electronic device of FIG. 1.

FIG. 3 illustrates that the camera module 10 includes a turnover element 11, a housing 12, and a camera assembly 13. The turnover element 11 and the housing 12 are both made of non-conducting materials.

The turnover element 11 is rotatably coupled to the base body 20, thus the camera module 10 can be movably received in the receiving groove 21. The turnover element 11 includes a support plate 111 and a connecting portion 112.

The support plate 111 is substantially rectangular. In an alternative embodiment, the support plate 11 can have an irregular shape or a regular shape such as ellipse or triangle.

Figure 4:
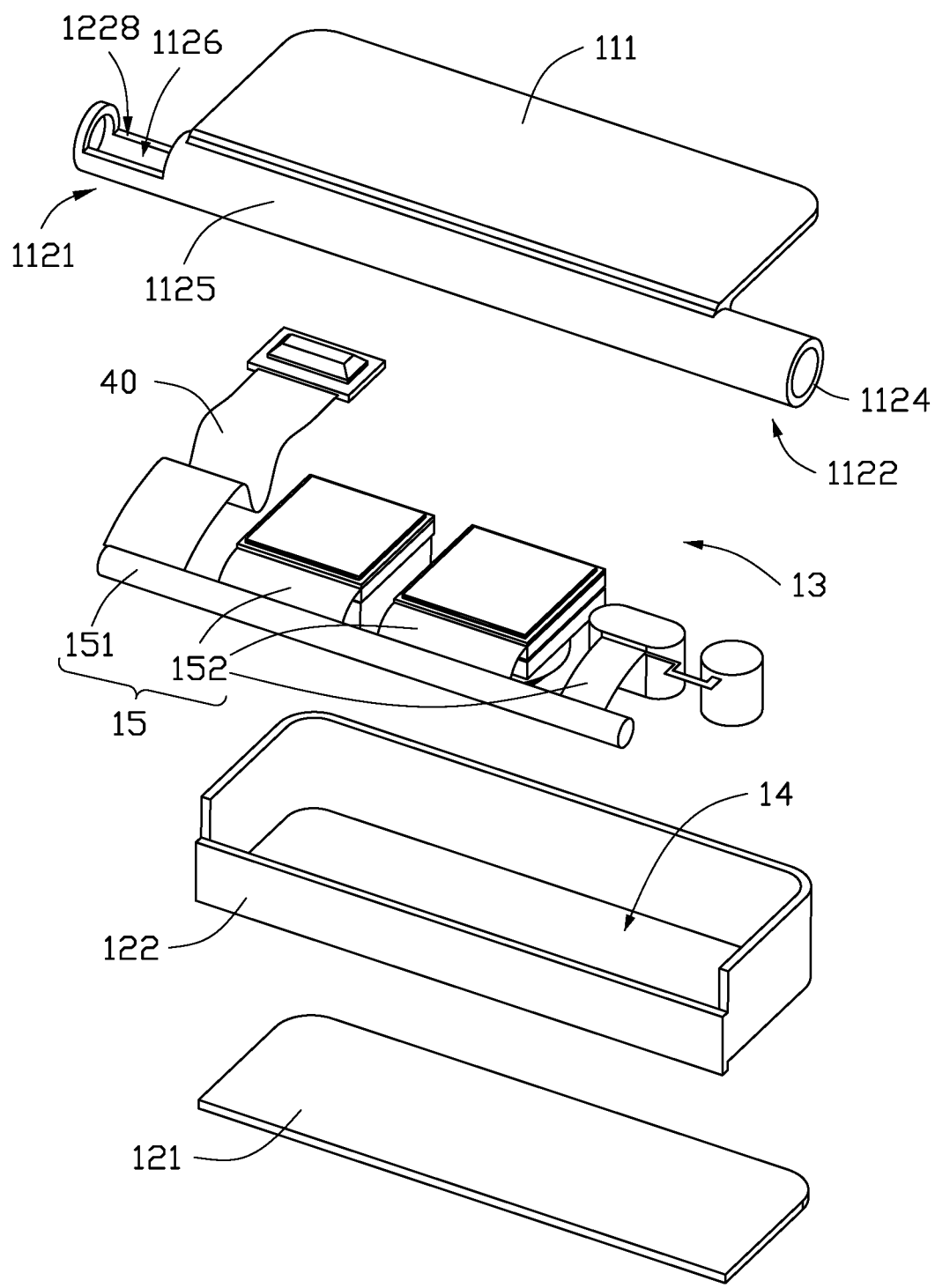
FIG. 4 is similar to FIG. 3, but viewed from another angle.

FIG. 4 illustrates that the connecting portion 112 is arranged on the support plate 111 and rotatably coupled to the base body 20. In one embodiment, the connecting portion 112 is arranged on an edge of the support plate 111, and the connecting portion 112 includes a first portion 1121 and a second end portion 1122 protruding beyond the support plate 111.

FIGS. 3 and 4 illustrate that the connecting portion 12 includes a first surface 1123, a second surface 1124 opposite to the first surface 1123, and a first circumference face 1125. The first surface 1123 is further away from the second end portion 1122 than the second surface 1124, and the second surface 1124 is further away from the first end portion 1121 than the first surface 1123. The first circumference face 1125 is arranged between the first surface 1123 and the second surface 1124, on a side of the support plate 111. The first surface 1123 and the second surface 1124 are both arranged on the outside of the support plate 111. The connecting portion 12 is substantially columnar.

The housing 12 is arranged on the support plate 111, the support plate 111 and the housing 12 together form a receiving space 14. The housing 12 includes a top wall 121 and a circumference wall 122. The circumference wall 122 is arranged on the periphery of the top wall 121 and located between the top wall 121 and the support plate 111. The top wall 121 is substantially rectangular. In an alternative embodiment, the top wall 121 can have an irregular shape or a regular shape such as ellipse or triangle.

The camera assembly 13 is received in the receiving space 14. The camera assembly 13 includes one or two cameras 131. Each camera 131 is arranged on the support plate 111. The top wall 121 of the housing 12 can be a transparent plate such as a glass plate, so as to enable the cameras 131 to capture photographs through the top wall 121. In an alternative embodiment, the number of the cameras 131 of the camera assembly 13 can be adjusted according to actual needs.

The camera assembly 13 further includes a flash lamp 132 and a focusing module 133. The flash lamp 132 and the focusing module 133 are both arranged on the support plate 111 and electrically coupled to the camera 131. In one embodiment, the focusing module 133 is a laser focusing module.

The camera assembly 10 further includes an electrical connecting element 15. The electrical connecting element 15 electrically connects the camera assembly 13 and the base body 20. The electrical connecting element 15 includes a first electrical connecting portion 151 and a second electrical connecting portion 152. The second electrical connecting portion 152 is connected to the first electrical connecting portion 151.

The first electrical connecting portion 151 is arranged in the connecting portion 112. The connecting portion 112 defines a through hole 1126. The through hole 1126 extends from the first surface 1123 to the second surface 1124, and passes through the second surface 1124. The first circumference face 1125 defines a first opening 1127 (shown in FIG. 5) on a side facing towards the support plate 111. The first opening 1127 communicates with the through hole 1126. Thus the first electrical connecting portion 151 is received in the through hole 1126 via the first opening 1127.

Figure 5:
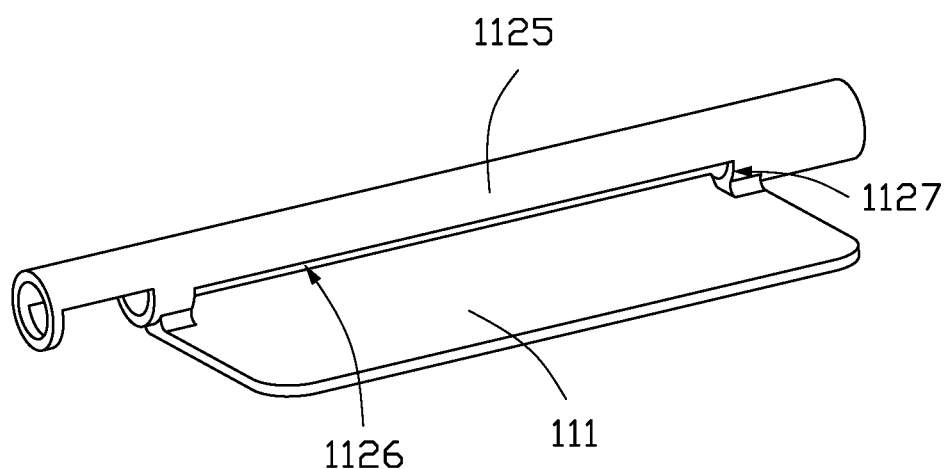
FIG. 5 is an isometric view of a connecting portion of the camera module of FIG. 3

FIGS. 4 and 5 illustrate that the second electrical connecting portion 152 is arranged on a surface of the support plate 111 facing the housing 12 and coupled to the first electrical connecting portion 151 via the first opening 1127. The second electrical connecting portion 152 is further coupled to the camera assembly 13. In one embodiment, there are three second electrical connecting portions 152 connected to the first electrical connecting portion 151. The three second electrical connecting portions 152 are electrically coupled to the camera 131, the flash lamp 132, and the focusing module 133 respectively. In an alternative embodiment, the number of the second electrical connecting portions 152 can be adjusted according to the number of elements included in the camera assembly 13.

FIG. 4 illustrates that the first circumference face 1125 of the connecting portion 112 further defines a second opening 1128. The second opening 1128 is located on the first end portion 1121. The second opening 1128 communicates with the through hole 1126. A part of the first electrical connecting portion 151 is exposed from the second opening 1128 and configured to electrically connect with other components of the electronic device 100.

Figure 6:
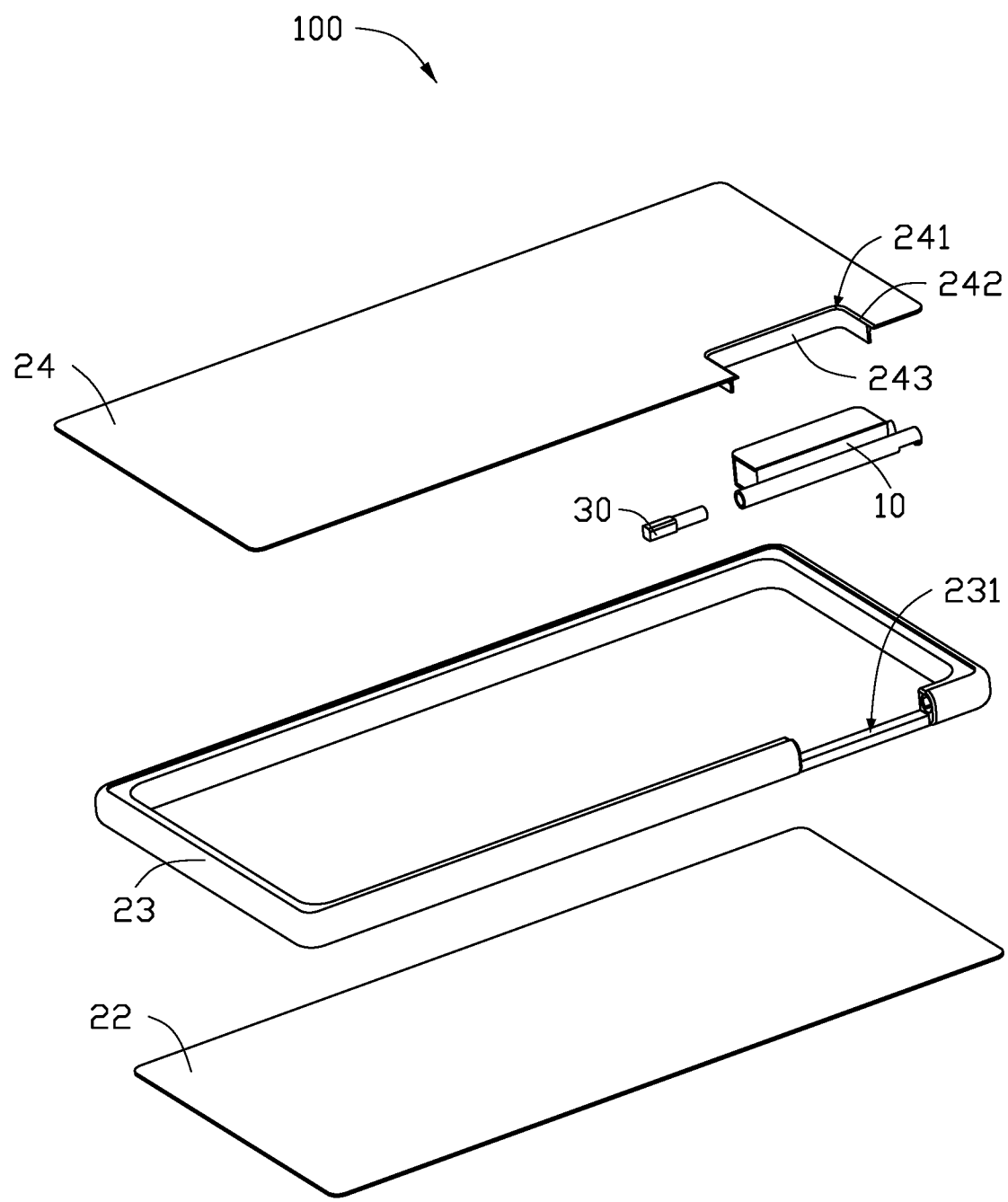
FIG. 6 is an exploded, isometric view of the electronic device of FIG. 1.

FIG. 6 illustrates that the base body 20 includes a display screen 22, a middle frame 23, and a bottom panel 24.

The display screen 22 is arranged on the middle frame 23. In one embodiment, the display screen 22 is a full screen display.

Figure 7:
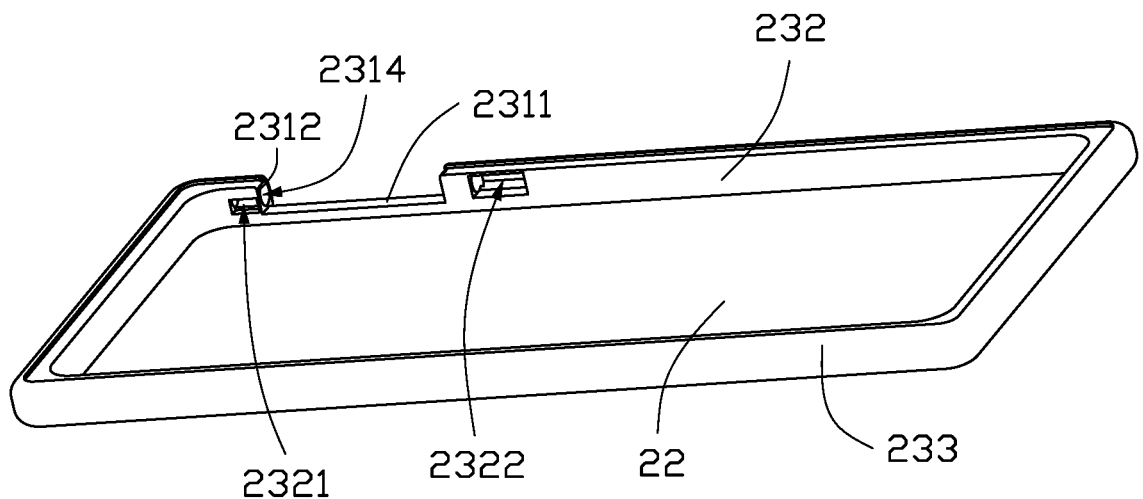
FIG. 7 is an isometric view of part of the electronic device of FIG. 1.
Figure 8:
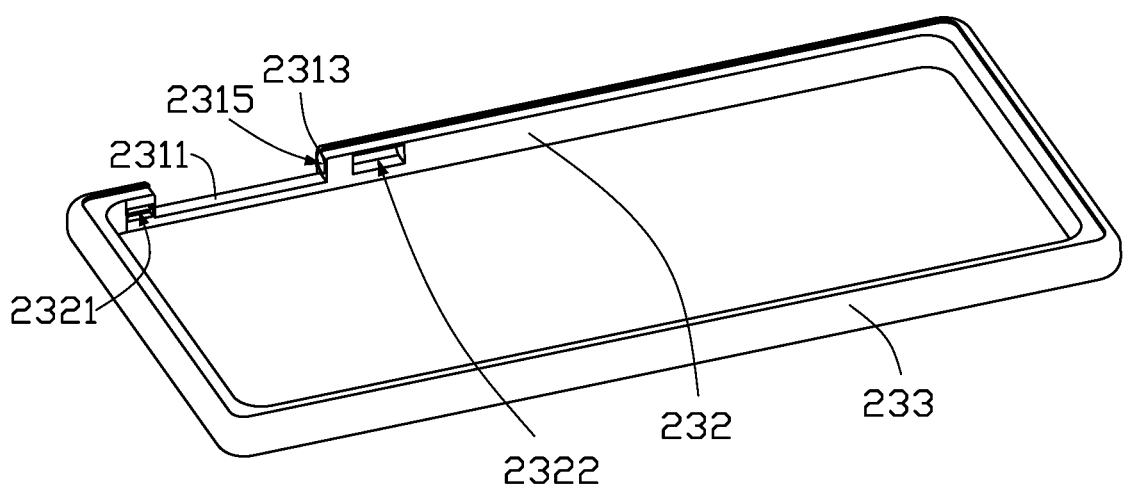
FIG. 8 is similar to FIG. 7, but viewed from another angle.

FIGS. 7 and 8 illustrate that the middle frame 23 defines a cut-out 231. The groove 231 is open in an opening direction back to the display screen 22. The groove 231, being behind the display screen 22, cannot be seen from the front when looking at the display screen 22. The groove 231 includes a bottom face 2311, a first side face 2312, and a second side face 2313 opposite to the first side face 2312. The first side face 2312 and the second side face 2313 are on two sides of the bottom face 2311. The first side face 2312 defines a first mounting hole 2314, and the second side face 2313 defines a second mounting hole 2315. The connecting portion 112 is received in the groove 231 and rotatably coupled to the middle frame 23. The first end portion 1121 of the connecting portion 112 is arranged in the first mounting hole 2314 and the second end portion 1122 of the connecting portion 112 is arranged in the second mounting hole 2315. Thereby the connecting portion 112 is rotatably coupled to the middle frame 23, and the camera module 10 is movably received in the receiving groove 21.

FIGS. 4, 7, and 8 illustrate that the middle frame 23 includes an inner surface 232 and an outer surface 233. The inner surface 232 is adjacent to the display screen 22. The inner surface 232 defines a third opening 2321. The third opening 2321 communicates with the first mounting hole 2314, and corresponds to the second opening 1128 of the first circumference face 1125. Thus, when first end portion 1121 of the connecting portion 112 is inserted in the first mounting hole 2314, a part of the first electrical connecting portion 151 is exposed from the third opening 2321.

Figure 9:
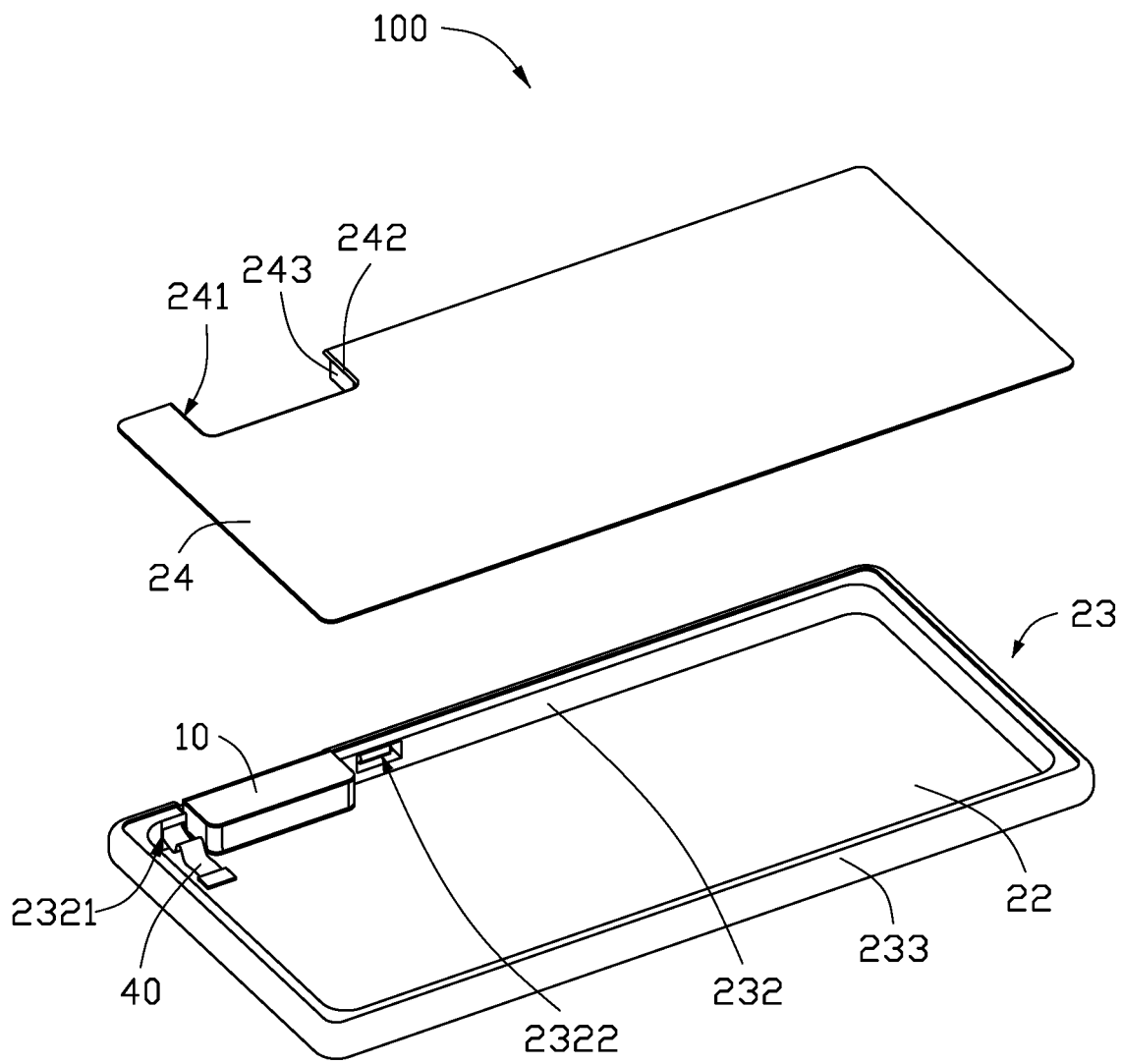
FIG. 9 is an exploded, isometric view of parts of the electronic device of FIG. 1.
Figure 10:
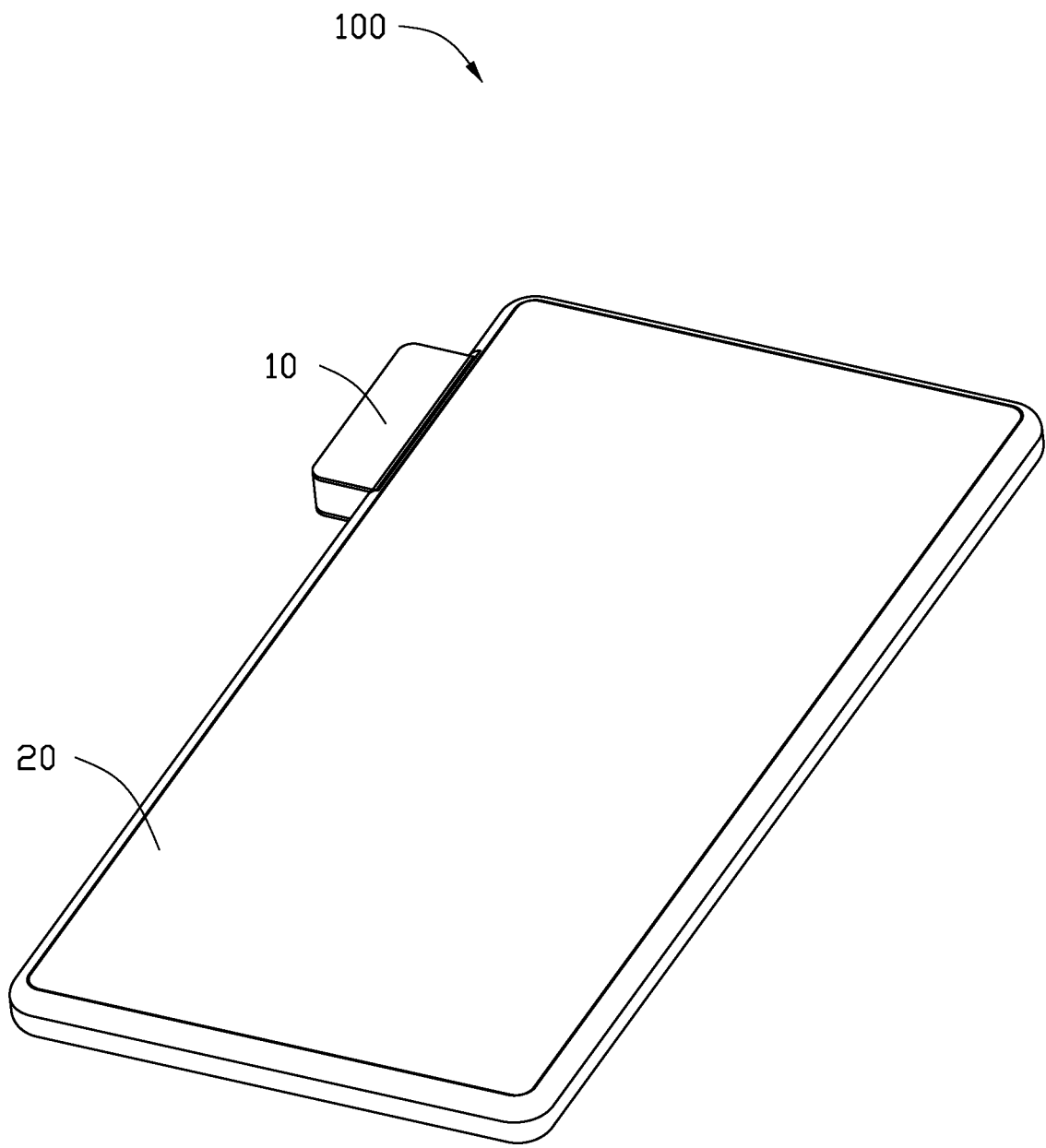
FIG. 10 is similar to FIG. 2, but view from another angle.

FIGS. 6 and 9 illustrate that the bottom panel 24 is arranged on a side of the middle frame 23 away from display screen 22. The bottom panel 24 defines a cutout 241 on an edge thereof. The bottom panel 24 defines a second circumference face 242 on the cutout 241. The second circumference face 242 extending towards the display screen 22 forms a protrusion plate 243. An end of the protrusion plate 243 away from the bottom panel 24 abuts the display screen 22. The protrusion plate 243 and a part of the display screen 22 corresponding to the cutout 241 cooperatively form the receiving groove 21.

FIGS. 4, 6, and 8 illustrate that the electronic device 100 further includes a driving element 30. A first end of driving element 30 is coupled to the second surface 1124 and received in the through hole 1126, and a second end of the driving element 30 is received in the second mounting hole 2315. Thus, inner space of the electronic device 100 is saved. In one embodiment, the driving element 30 is a motor.

FIGS. 7 and 8 illustrate that the inner surface 232 defines a fourth opening 2322. The fourth opening 2322 communicates with the second mounting hole 2315. A part of the driving element 30 is exposed in the fourth opening 2322.

FIGS. 4 and 9 illustrate that the electronic device 100 further includes a connecting member 40. The connecting member 40 is arranged in the base body 20, and an end of the connecting member 40 passes through the third opening 2321 and the second opening 1128 in turn to connect to the first electrical connecting portion 151, thus the camera assembly 13 is electrically coupled to other components in the base body 20.

Figure 11:
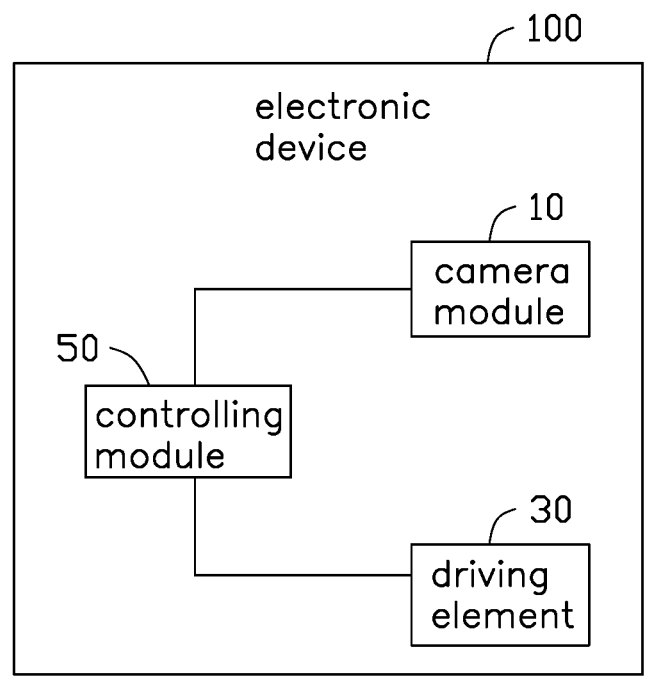
FIG. 11 is a block diagram of part of the electronic device of FIG. 1.

FIG. 11 illustrates that the electronic device 100 further includes a controlling module 50. The controlling module 50 is arranged in the electronic device 100, connects to the driving element 30, and activates the driving element 30 to rotate the turnover element 11. The controlling module 50 is also coupled to the camera assembly 13, thus turning the camera assembly 13 on and off.

A working principle of the camera module 10 is described as follows.

When the camera module 10 is within the receiving groove 21, as shown in FIG. 1, the camera module 10 can photograph other people.

When a selfie is required (i.e. switch from rear photography to front photography), the controlling module 50 controls the driving element 30 to drive the turnover element 11 to turn over, around the connecting portion 112 through 180 degrees, until the camera module 10 and the display screen 22 are on the same horizontal plane (shown in FIG.

10). The controlling module 50 can then control the camera assembly 13 to turn on for self-photography.

To photograph other people (i.e. switch from front photography to rear photography), firstly, the controlling module 50 controls the camera module 13 to turn off. And then, the controlling module 50 controls the driving element 30 to drive the turnover element 11 to rotate around the connecting portion 112 until the camera module 10 is fully received in the receiving groove 21 (shown in FIG. 1). And then, the controlling module 50 controls the camera assembly 13 to turn on for photographing other people.

The camera module 10 is rotatably coupled to the base body 20, thus the electronic device 100 can be configured for self-photographing and for photographing other people with only one camera module 10. Thus, a screen ratio of the electronic device 100 is not decreased, an inner space of the electronic device 100 is saved, a weight of the electronic device 100 is lowered, and a production cost of the electronic device 100 is also lowered.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A camera module comprising:
   a turnover element comprising a support plate and a connecting portion arranged on the support plate;
   a housing arranged on the support plate, the housing and the support plate cooperatively forming a receiving space; and
   a camera assembly received in the receiving space;
   wherein the connecting portion is on an outside of the housing;
   wherein the camera module further comprises an electrical connecting element, the electrical connecting element comprises a first electrical connecting portion and a second electrical connecting portion connecting the first electrical connecting portion;
   the connecting portion comprises a first surface, a second surface opposite to the first surface, and a circumference face arranged between the first surface and the second surface and arranged on the side of the support plate, the connecting portion defines a through hole extending from the first surface to the second surface and passing through the second surface, the circumference face defines a first opening on a side facing towards the support plate and a second opening adjacent to the first surface;
   each of the first opening and the second opening communicates with the through hole, the first electrical connecting portion is received in the through hole via the first opening, the second electrical connecting portion passes through the first opening and directly connected to the camera assembly, and a part of the first electrical connecting portion is exposed from the second opening and configured to electrically connect with other components of an electronic device.

2. The camera module of claim 1, wherein the connecting portion is arranged on a side of the support plate, and opposite ends of the connecting portion protrude beyond the support plate.

3. An electronic device comprising:
   a base body, a side of the base body defining a receiving groove; and
   a camera module rotatably received in the receiving groove, the camera module comprising:
      a turnover element comprising a support plate and a connecting portion arranged on the support plate,
      a housing arranged on the support plate, the housing and the support plate cooperatively forming a receiving space, and
      a camera assembly received in the receiving space,
      wherein the connecting portion is on an outside of the housing;
   wherein the camera module further comprises an electrical connecting element, the electrical connecting element comprises a first electrical connecting portion and a second electrical connecting portion connecting the first electrical connecting portion;
   the connecting portion comprises a first surface, a second surface opposite to the first surface, and a circumference face arranged between the first surface and the second surface and arranged on the side of the support plate, the connecting portion defines a through hole extending from the first surface to the second surface and passing through the second surface, the circumference face defines a first opening on a side facing towards the support plate and a second opening adjacent to the first surface;
   each of the first opening and the second opening communicates with the through hole, the first electrical connecting portion is received in the through hole via the first opening, the second electrical connecting portion passes through the first opening and directly connected to the camera assembly, and a part of the first electrical connecting portion is exposed from the second opening and configured to electrically connect with other components of an electronic device.

4. The electronic device of claim 3, wherein the base body comprises a display screen, a middle frame, and a bottom panel, the display screen is arranged on the middle frame, the bottom panel is arranged on a side of the middle frame away from the display screen, an edge of the bottom panel defines a cutout, a surface of the bottom panel facing towards the display screen carries a protrusion plate abutting the display screen, wherein the protrusion plate is on the periphery of the cutout, the protrusion plate and a part of the display screen corresponding to the cutout cooperatively form the receiving groove.

5. The electronic device of claim 4, wherein the middle frame defines a groove, the groove is open in an opening direction back to the display screen, the connecting portion is received in the groove and rotatably coupled to the middle frame.

6. The electronic device of claim 3, wherein the connecting portion is arranged on a side of the support plate, and opposite ends of the connecting portion protrude beyond the support plate.

* * * * *